United States Patent [19]

Abbey

[11] Patent Number: 4,982,548
[45] Date of Patent: Jan. 8, 1991

[54] BEAM HANGER FOR PRECAST FOUNDATIONS

[76] Inventor: Jay E. Abbey, 416 Port Rd., Binghamton, N.Y. 13901

[21] Appl. No.: 394,912

[22] Filed: Aug. 17, 1989

[51] Int. Cl.$^5$ ............................................. E04B 1/381
[52] U.S. Cl. ........................................ 52/702; 52/289; 403/232.1
[58] Field of Search ................. 52/702, 289, 602, 262; 403/232.1

[56] References Cited

U.S. PATENT DOCUMENTS

| | | | |
|---|---|---|---|
| 1,097,934 | 5/1914 | Price | 52/702 X |
| 2,911,690 | 11/1959 | Sanford | 403/232.1 |
| 3,537,221 | 11/1970 | Helfman et al. | 52/702 X |
| 4,341,051 | 7/1982 | Sim et al. | 52/702 |
| 4,422,792 | 12/1983 | Gilb | 403/232.1 |
| 4,856,252 | 8/1989 | Cornell | 52/702 |

Primary Examiner—David A. Scherbel
Assistant Examiner—Lan Mai
Attorney, Agent, or Firm—Salzman & Levy

[57] ABSTRACT

The invention features a beam hanger for use in combination with a precast foundation wall unit. The beam hanger allows for the mass production of identical foundation wall units, since it can be placed at regular intervals along the foundation length. The beam hanger eliminates the requirement for precast beam pockets that prevent identical, mass production wall units.

23 Claims, 2 Drawing Sheets

BEAM HANGER FOR PRECAST FOUNDATIONS

FIELD OF THE INVENTION

This invention features a beam hanger device for use in combination with a foundation structural unit, and more particularly a beam or girder hanger for use with a precast, concrete foundation unit.

BACKGROUND OF THE INVENTION

In recent times, many innovative ideas are being implemented in the construction of dwelling houses. Attempts are being made to lower labor and material costs by utilizing mass production techniques. One such mass production technique features the use of modular units that are assembled in a factory and then shipped to the construction site, where they are bolted together.

Another such mass production method employs the concept of precast waffle-type wall and foundation units that are also bolted together at the construction site. This precast system has the advantage of allowing the builder more flexibility in design with respect to the modular concept. It still reduces construction costs by providing precast building units that require less assembly and labor.

One of the current problems with precast construction, however, results from its attempts to provide flexibility of design. Flexible design requires that foundation units have beam pockets that are cast in place. These beam pockets support steel beams or wood girders at adjustable or desired locations along the wall. Therefore, in order to accommodate this need, special panels must be precast for each specific construction job, which seriously hampers or eliminates mass production runs.

This invention seeks to provide an apparatus for supporting beams anywhere along the foundation wall, and thus to restore the mass production of identical foundation wall units.

While the use of beam hangers is commonplace in standard beam construction, as illustrated by U.S. Pat. Nos. 1,097,934, issued: May 26, 1914; 1,720,104, issued: July 9, 1929; 3,537,221, issued: June 19, 1967; 4,353,664, issued: Oct. 12, 1982; 4,422,792, issued: Dec. 27, 1983; they have never been used for foundations.

Even if they were, however, the precast foundation unit presents certain design problems that are uncommon to the art. For example, a bracing angle bracket for providing lateral and bending support requires a special design to span the hollow section presented by waffle configuration.

The uniqueness of the invention will become more apparent and will be better understood with reference to the following description and detailed drawings.

SUMMARY OF THE INVENTION

The invention relates to a beam hanger for use in combination with foundation units used to construct buildings and homes. The beam hanger for purposes of definition comprises a generally U-shaped cradle for receiving and supporting a steel beam or wooden girder. The cradle is secured to the foundation sill or lateral portion by a flange that is attached to the cradle. The flange has an L-shaped cross-section which is defined by two unequal legs. The larger of the two legs is disposed upon the foundation sill and is bolted thereto.

An angle bracket is connected at the bottom of the cradle and extends across the foundation wall hollow to abut against two internal supporting posts. The internal posts result from the waffle-type form that precasting defines in the wall unit.

This angle bracket is designed to accommodate bending and twisting forces that may be placed upon the cradle by the beam or girder. The angle bracket has two arms that result in a right-angle bend. One arm abuts the cradle bottom and the other arm abuts the posts.

It is an object of the invention to provide a beam hanger for a foundation wall.

It is another object of this invention to provide in combination a beam hanger specifically adapted to a waffle-type precast foundation wall unit.

BRIEF DESCRIPTION OF THE DRAWINGS

A complete understanding of the present invention may be obtained by reference to the accompanying drawings, when taken in conjunction with the detailed description thereof and in which.

Figure 1:
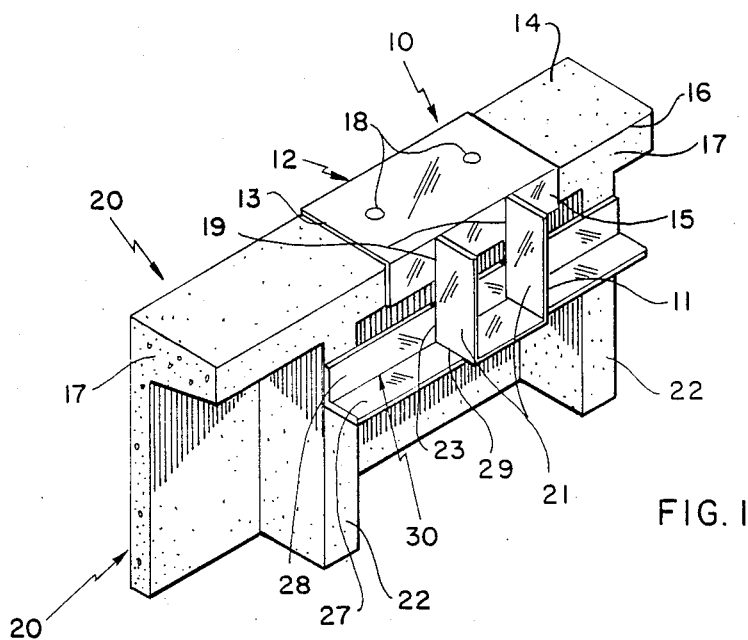
FIG. 1 depicts a perspective, in situ view of the beam hanger and precast foundation wall unit of this invention.
Figure 2:
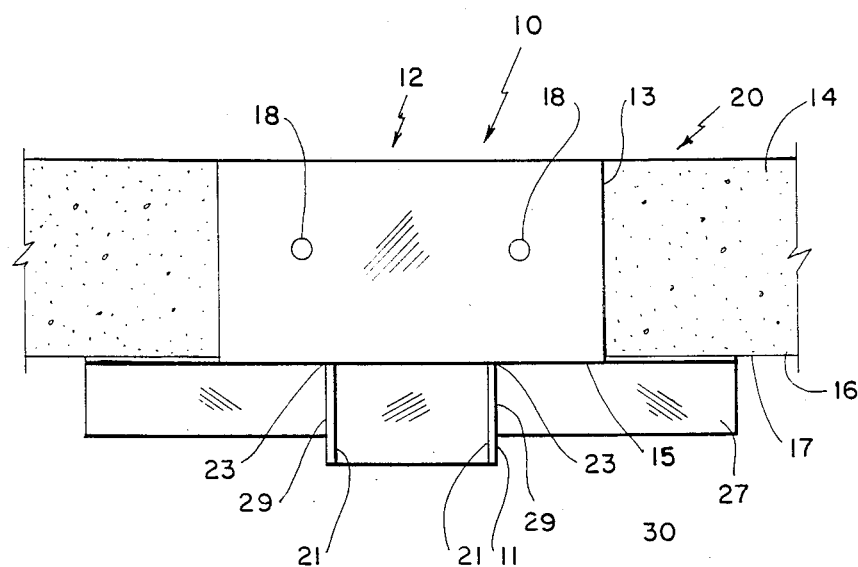
FIG. 2 is a top view of the beam hanger and precast foundation wall unit shown in FIG. 1.

FIG. a front view of the beam hanger and foundation unit of FIG. 1; and

Figure 4:
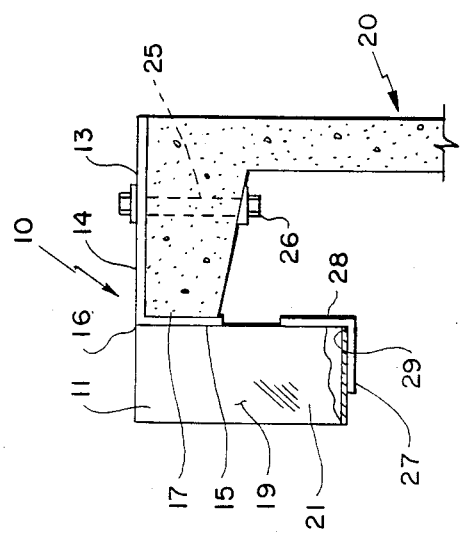
Figure 3:
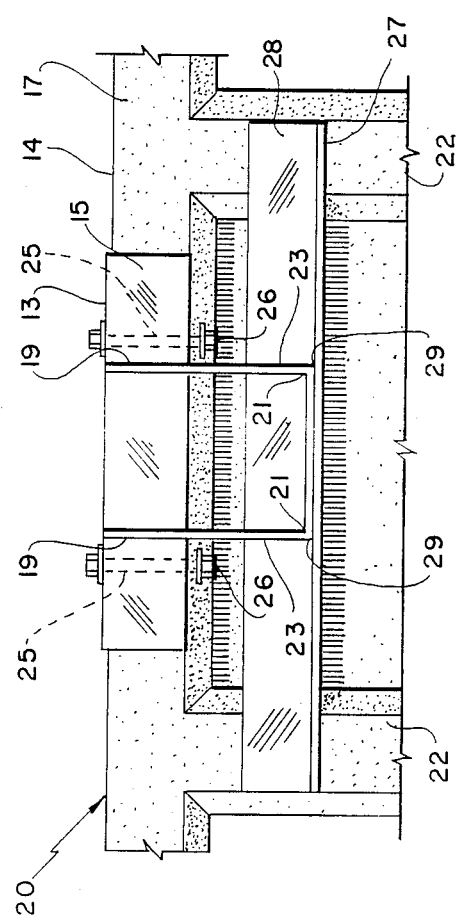

FIG. 4 a sectional view of the beam hanger and foundation wall unit of FIG. 3 taken along lines 3—3.

DESCRIPTION OF THE PREFERRED EMBODIMENT

Generally speaking, the invention pertains to a beam hanger for use in combination with a precast foundation wall unit.

Like components will have the same designation throughout the figures.

Now referring to FIGS. 1 through 4, a beam hanger 10 is shown in situ with a precast, foundation wall unit 20 of a waffle-type design.

The beam hanger 10 has a U-shaped cradle 11, that is designed to receive and support a steel beam or wood girder (not shown). The U-shaped cradle 11 is attached to an L-shaped flange 12, whose large leg 13 has the same width as the sill 14 of the foundation wall unit 20.

The shorter leg 15 of flange 12 extends over the edge 16 of sill 14 and has the width of the vertical lip 17.

The flange 12 bolts to the sill 14 via bolt holes 18, through which bolts 25 are passed and anchored by locking nuts 26 (FIGS. 3 and 4).

The U-shaped cradle 11 is attached to the flange 12 by welds 19 disposed along the edge formed between leg 15 of flange 12 and vertical arms 21 of the cradle 11.

A support bracket 30 is shown disposed below cradle 11 and comprises a right-angle bend which is defined by arms 27 and 28, respectively.

Arm 27 supports cradle 11 and is attached thereto by welds disposed along edges 29.

Arm 28 attaches to cradle 11 by welds disposed along edges 23.

These surfaces can also be mechanically fastened.

The angle bracket 30 extends between the two internal supporting posts 22 of the foundation wall unit 20. The angle bracket 30 lends support to the beam hanger 10 against bending and twisting forces that may be exerted by the beam girder disposed in cradle 11.

The internal supporting posts 22 result from the precast waffle-type design of the foundation wall unit 20.

It is important from the standpoint of mechanical strength that angle bracket 30 abuts both internal support posts 22. Its design provides sufficient length to accomplish this extension.

The length of the angle bracket 30 is such that it can be placed between any two internal posts 22 along the entire length of a foundation wall. In this manner, all the wall units 20 along the wall can be precast in a mass produced run, while the design of any custom-made foundation is maintained by the flexible placement of beams or girders anywhere along the wall length.

Having thus described the invention, what is desired to be protected by Letters Patent is presented by the subsequently appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A beam hanger for use in combination with a foundation wall of a building or home having at least two spaced apart internal support members, comprising:
    a cradle for receiving and supporting a beam type member;
    securing means attached to said cradle securing said cradle to a sill or lateral portion of a foundation wall; and
    bracing means disposed adjacent said cradle and said securing means and extending laterally across and abutting at least two of the internal support members of said foundation wall for providing bracing support for said cradle with respect to said two internal support members of said foundation wall, whereby a beam type member supported in said cradle will be braced against bending and twisting forces by said internal support members.

2. The beam hangar of claim 1, wherein said cradle, securing means and bracing means are all structurally integral.

3. The beam hanger of claim 2, wherein said cradle is welded to said securing means and said bracing means to provide integral integrity.

4. The beam hanger of claim 1, wherein said cradle comprises a vertically-oriented U-shaped bracket.

5. The beam hanger of claim 4, wherein said securing means comprises a flange having two unequal legs defining an L-shaped cross-section, one leg of said flange being securable to said sill and the other of said two legs being attached to said cradle.

6. The beam hanger of claim 5, wherein said flange is securable to said sill by bolt and nut fasteners.

7. The beam hanger of claim 5, wherein said bracing means comprises an angle bracket having two arms defining an approximate right-angle bend, one arm of said angle bracket supporting said U-shaped cradle bracket and the other arm of said two arms abutting said two internal support members of said foundation wall.

8. The beam hanger of claim 4, wherein said bracing means comprises an angle bracket having two arms defining an approximate right-angle bend, one arm of said angle bracket supporting said U-shaped cradle bracket and the other arm of said two arms abutting said two internal support members of said foundation wall.

9. The beam hanger of claim 1, wherein said securing means comprises a flange having two unequal legs defining an L-shaped cross-section, one leg of said flange being securable to said sill and the other of said two legs being attached to said cradle.

10. The beam hanger of claim 9, wherein said flange is securable to said sill by bolt and nut fasteners.

11. The beam hanger of claim 9, wherein said bracing means comprises an angle bracket having two arms defining an approximate right-angle bend, one arm of said angle bracket supporting said cradle and the other arm of said two arms abutting and extending across said two internal support members of said foundation wall.

12. The beam hanger of claim 1, wherein said securing means is securable to said sill by bolt and nut fasteners.

13. The beam hanger of claim 1, wherein said bracing means comprises an angle bracket having two arms defining an approximate right-angle bend, one arm of said angle bracket supporting said U-shaped cradle bracket and the other arm of said two arms abutting said two internal support members of said foundation wall.

14. A beam hanger in combination with a precast, waffle-type, foundation wall unit, said foundation wall unit comprising a vertical wall having an overhanging sill integrally cast with vertically disposed internal post supports, said beam hanger supporting a beam type member, and having a brace extending across and abutting at least two of said internal post supports in order to brace said beam type member against twisting and bending forces.

15. A beam hanger for use in combination with a precast, waffle-type foundation wall unit comprising a vertical wall and overhanging sill integrally cast with vertically disposed internal post supports, said beam hanger including:
    a cradle for receiving and supporting a beam type member;
    securing means for attaching said cradle to said sill; and
    bracing means disposed adjacent said cradle and extending laterally across said vertical wall and spanning and abutting at least two internal post supports, said bracing means comprising an angle bracket having two arms defining an approximate right-angle bend, one arm of said angle bracket supporting said cradle and the other arm of said two arms abutting said internal post supports, said bracing means for providing bracing support for said cradle with respect to said internal post supports, whereby twisting and bending forces exerted upon said beam type member are translated to said internal supports by said bracing means.

16. The beam hanger of claim 15, wherein said cradle, securing means and bracing means are all structurally integral.

17. The beam hanger of claim 16, wherein said cradle is welded to said securing means and said bracing means to provide integral integrity.

18. The beam hanger of claim 15, wherein said cradle comprises a vertically-oriented U-shaped bracket.

19. The beam hanger of claim 18, wherein said securing means comprises a flange having two unequal legs defining an L-shaped cross-section, one leg of said flange being securable to said sill and the other of said two legs being attached to said cradle.

20. The beam hanger of claim 18, wherein said flange is securable to said sill by bolt and nut fasteners.

21. The beam hanger of claim 15, wherein said securing means comprises a flange having two unequal legs defining an L-shaped cross-section, one leg of said flange being securable to said sill and the other of said two legs being attached to said cradle.

22. The beam hanger of claim 21, wherein said flange is securable to said sill by bolt and nut fasteners.

23. The beam hanger of claim 15, wherein said securing means is securable to said sill by bolt and nut fasteners.

* * * * *